(12) United States Patent
Wilcox et al.

(10) Patent No.: US 7,191,940 B2
(45) Date of Patent: Mar. 20, 2007

(54) USER PROGRAMMABLE INTERACTIVE DISPLAY DEVICE AND METHOD

(76) Inventors: Clinton Wilcox, 13395 Bass Trail, Grass Valley, CA (US) 95945; Armen E. Kazanchian, 2345 Montrose Ave., #7, Montrose, CA (US) 91020

( * ) Notice: Subject to any disclaimer, the term of this patent is extended or adjusted under 35 U.S.C. 154(b) by 0 days.

(21) Appl. No.: 11/162,910

(22) Filed: Sep. 28, 2005

(65) Prior Publication Data

US 2006/0113378 A1 Jun. 1, 2006

Related U.S. Application Data

(63) Continuation-in-part of application No. 10/999,717, filed on Nov. 30, 2004.

(51) Int. Cl.
*G06K 5/00* (2006.01)
(52) U.S. Cl. ................... 235/380; 235/487
(58) Field of Classification Search ............. 235/380, 235/451, 487, 492
See application file for complete search history.

(56) References Cited

U.S. PATENT DOCUMENTS

| | | | |
|---|---|---|---|
| 4,887,161 A | 12/1989 | Watanabe et al. | |
| 5,226,117 A * | 7/1993 | Miklos | 715/853 |
| 5,534,921 A | 7/1996 | Sawanobori | |
| 5,777,903 A | 7/1998 | Piosenka et al. | |
| 5,841,878 A | 11/1998 | Arnold et al. | |
| 5,852,807 A * | 12/1998 | Skarbo et al. | 705/7 |
| 5,936,542 A | 8/1999 | Kleinrock et al. | |
| 5,963,128 A | 10/1999 | McClelland | |
| 6,019,284 A | 2/2000 | Freeman et al. | |
| 6,084,951 A * | 7/2000 | Smith et al. | 379/93.17 |
| 6,160,788 A | 12/2000 | Kobayashi et al. | |
| 6,254,001 B1 * | 7/2001 | Chan | 235/380 |
| 6,369,793 B1 | 4/2002 | Parker | |
| 6,570,596 B2 * | 5/2003 | Frederiksen | 715/808 |
| 6,616,052 B2 | 9/2003 | Tseng et al. | |
| 6,680,715 B2 | 1/2004 | Blotky et al. | |
| 6,724,427 B1 | 4/2004 | Fredlund et al. | |
| 6,856,353 B1 | 2/2005 | Misawa | |
| 2002/0019296 A1 | 2/2002 | Freeman et al. | |
| 2002/0144442 A1 | 10/2002 | Harasawa et al. | |
| 2003/0050999 A1 | 3/2003 | Charnoff | |
| 2003/0205615 A1 | 11/2003 | Marappan | |
| 2004/0189850 A1 | 9/2004 | Chang | |
| 2005/0212944 A1 | 9/2005 | Guy | |
| 2005/0264990 A1 * | 12/2005 | LaGarde | 361/683 |

FOREIGN PATENT DOCUMENTS

JP 02003123035 A * 4/2006

* cited by examiner

*Primary Examiner*—Steven S. Paik
(74) *Attorney, Agent, or Firm*—Alvin R. Wirthlin (57) ABSTRACT

A method for transferring data from a user station to a portable electronic display device includes providing one or more data sets, linking the data sets together in a predetermined sequence for accessing the data sets, and providing each data set with one or more data frames. Each data frame can be linked to another data frame of a single data set for sequentially displaying information such as images and/or text on a display screen of the portable electronic display device.

20 Claims, 7 Drawing Sheets

USER PROGRAMMABLE INTERACTIVE DISPLAY DEVICE AND METHOD

CROSS-REFERENCE TO RELATED APPLICATIONS

This application is a Continuation-in-Part of U.S. application Ser. No. 10/999,717 filed on Nov. 30, 2004, the disclosure of which is hereby incorporated by reference.

BACKGROUND OF THE INVENTION

This invention relates to display devices, and more particularly to a user programmable electronic display device for displaying stored information thereon and a method of providing the information for display in a user-defined sequence.

The use of conventional printed business cards is standard practice for introducing an individual or a company to others. The printed business card generally records fundamental information such as the name, title, address, or telephone number of the individual or the company. For convenience, the conventional printed business card has a standard size of 2 inches by 3.5 inches. Since the size of the printed business card is fixed, the amount of information that can be recorded is restricted. Therefore, except for the fundamental information described above, other useful information such as personal publications, academic backgrounds, professional backgrounds, or company catalogs, product offerings, services, and so on, cannot be recorded on the limited sheet of paper.

Nevertheless, with the prevalence of computers, all kinds of data can be stored as computer files in various forms such as document files, data structures, diagrams, images or multimedia files. Thus, a portable recording media used in a computer system may be capable of replacing the conventional printed business card for recording the personal data. However, prior art recording media typically do not come with displays for readily viewing the information on the recording media. A personal computer with a media reading device thus becomes necessary to display such information. Consequently, the media may be discarded and the information, which is otherwise designed to attract new business, may not be viewed.

It would therefore be desirable to provide an electronic display device which is capable of containing much more information than is capable of being printed upon a conventional business card or advertising brochure, yet has a size which generally corresponds to that of a conventional business card so that the device can be conveniently carried and stored in a conventional-sized wallet. It would be further desirable to provide a software system and method for programming the display device to display data in a predetermined sequence in accordance with the discretion of a user.

SUMMARY OF THE INVENTION

According to one aspect of the invention, a method for transferring data from a user station to a portable electronic display device comprises the following steps: providing a first virtual window at the user station; inserting at least one data set icon into the first virtual window; opening a second virtual window representative of the at least one data set icon; inserting at least one data frame icon into the second virtual window; associating data with the at least one data frame from a memory device of the user station; and transferring the data including information relating to the at least one data set and at least one data frame to the portable electronic display device.

According to a further aspect of the invention, a method for transferring data from a user station to a portable electronic display device comprising the following steps: providing a first virtual window at the user station; inserting a plurality of data set icons into the first virtual window, the data set icons being representative of data sets; linking the data set icons together such that data sets are displayed on the portable electronic display device in a predetermined sequence; providing second virtual windows corresponding to the data set icons; inserting a plurality of data frame icons into each second virtual window, the data frame icons being representative of data frames; linking the data frame icons together such the data frames are displayed on the portable electronic display device in a predetermined sequence for each data set; and transferring the data sets including the data frames to the portable electronic display device for display thereon.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE PREFERRED EMBODIMENTS

Figure 1:
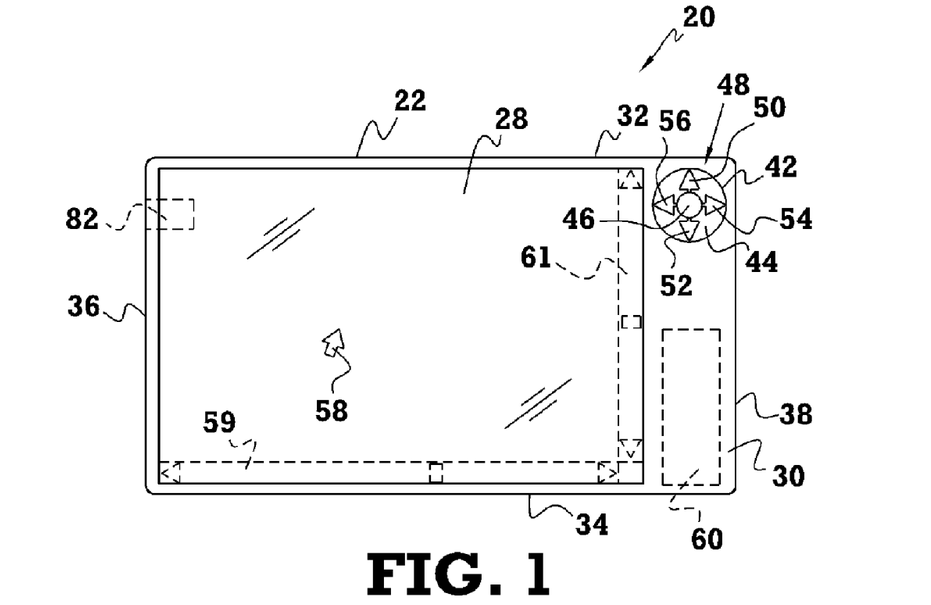
FIG. 1 is a front elevational view of an interactive electronic display device in accordance with an exemplary embodiment of the present invention.
Figure 2:
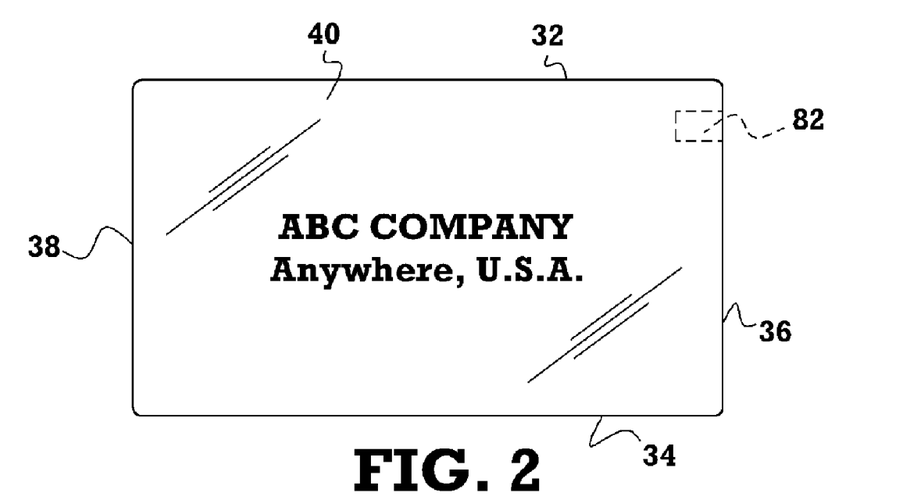
FIG. 2 is a rear elevational view of the electronic display device.
Figure 3:
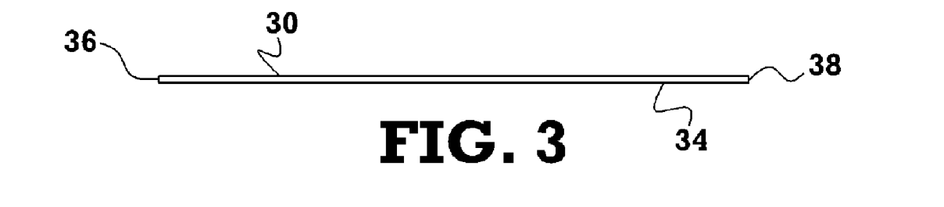
FIG. 3 is a top plan view of the electronic display device.

With reference now to the drawings, and to FIGS. 1–3 in particular, a programmable interactive display device 20 in accordance with an exemplary embodiment of the present invention is illustrated. The device 20 includes a case 22 within which is housed electronic components, as will be described in further detail below, for displaying stored data in user readable format. The device 20 is well-suited as a substitute for a paper business card (for displaying to a user the type of information which is normally printed upon a business card) and has the capabilities to display to a user the pages (e.g. of a company website) which are normally viewable on the world wide web. It will be understood that the device 20 is not limited to business card applications, but may be used to display any type of information of interest to the user, such as text, drawings, photographs, and so on. By way of example, the display device 20 can be used to share business or advertising information related to new products, services, and/or promotions. In this regard, it is desirable that the electronic display device be relatively low in cost so that such information can be easily disseminated.

Figure 6:
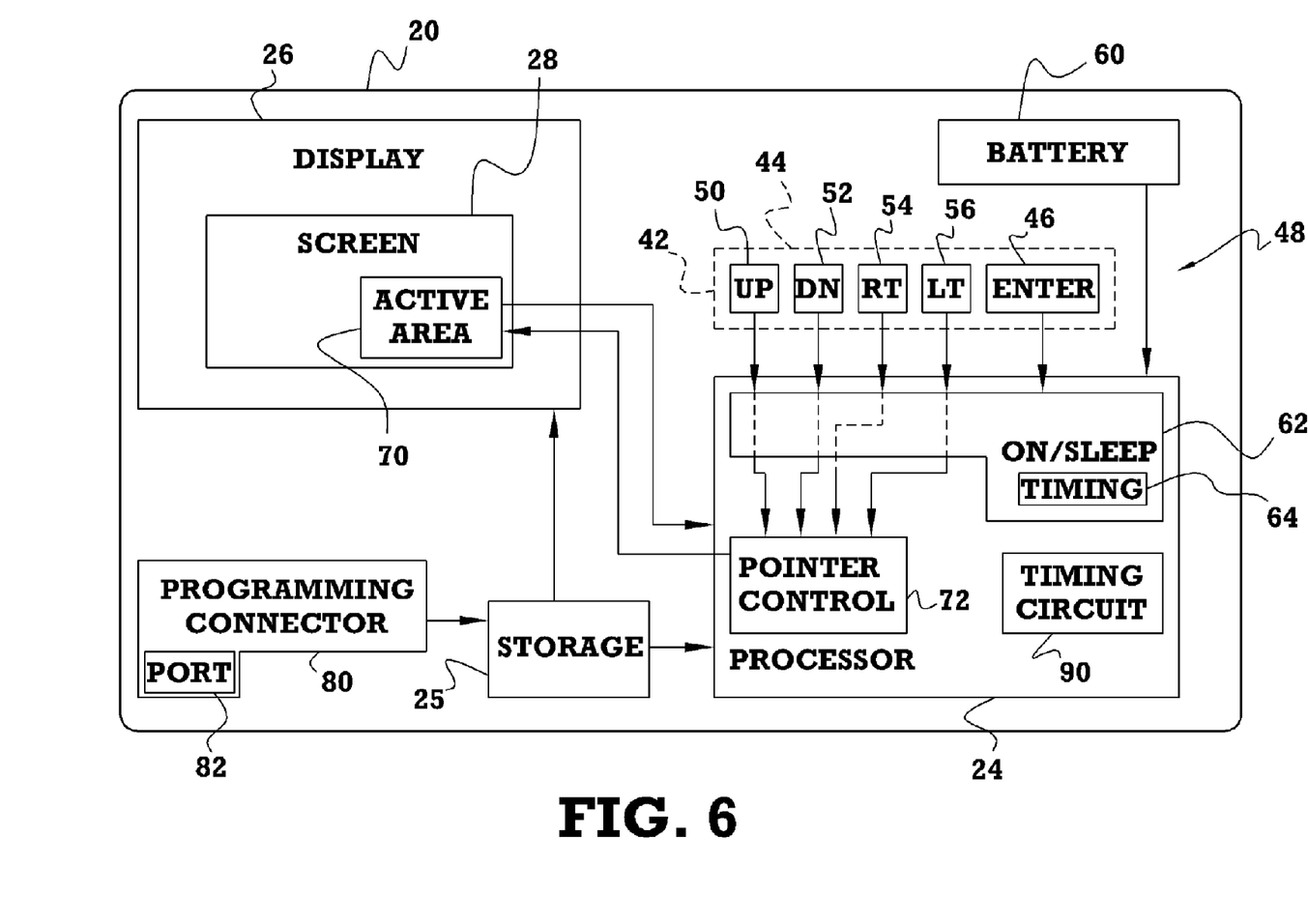
FIG. 6 is a block diagram of electrical components that form part of the electronic display device.
Figure 7:
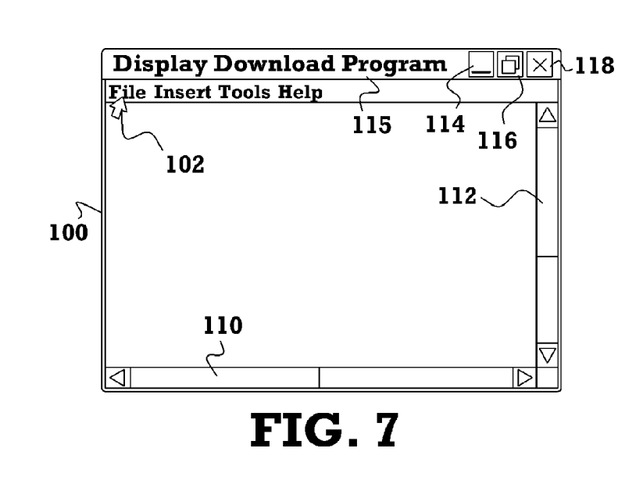
FIG. 7 illustrates a user interface menu of a software program for customizing the contents of and downloading data to the electronic display device from a separate user interface device, such as a personal computer.

With reference to FIG. 6, the device 20 includes a processor 24 mounted within the case 22, a memory 25 operably connected to the processor 24 and a display 26 with a display screen 28 mounted within the case 22. The memory 25 is preferably of the flash memory type and the processor may be in the form of a microcontroller, microprocessor, or other suitable device that interfaces between the memory 25 and display 26 so that during use, various operations of the device 20, including data display, can be controlled by the processor 24. When appropriate command signals are sent from the processor 24 to the memory 25, stored information is sent to the display 26 where it is displayed on the screen 28 in user readable format.

With reference again to FIGS. 1–3, the case 22 preferably comprises a shallow box (constructed, for example, of flexible, rigid or semi-rigid metal, plastic, composite material, and so on) and includes a front 30 (within which the display screen 28 is mounted) opposite sides 32 and 34, opposite ends 36 and 38 and a back 40. Printed matter 41 may be located on a surface of the back 40, as shown in FIG. 2. By way of example, the printed matter may include a name, address, etc. a company or individual whose identification information is stored within the memory 25, advertising information, company logos, and so on. The processor 24 includes a user interface 42 including a keypad 44 which permits a user to manually enter various commands into the processor 24 to initiate and perform selected functions. As illustrated, the keypad 44 includes navigation keys, generally indicated at 48, comprising an UP key 50, a DOWN key 52, a RIGHT key 54 and a LEFT key 56 for controlling the positional relationship of a pointer 58 (FIG. 1) upon the display screen 28. As will be apparent herein, the user may desire to alter the position of the pointer 58 to effect the changing of a page being displayed on the screen 28 or to scroll through a displayed page by positioning the pointer 50 over scroll bars 59 and 61 (shown in dashed line) that may be present on the display screen 28. The keypad 44 further includes an ENTER key 46 which, when depressed, initiates a selected operation of the device 20, depending on the position of the pointer 50. In accordance with a further embodiment of the invention, the pointer 50 may be supplemented with or replaced by an active area of the screen 28 with virtual selection buttons that can be highlighted and selected by depressing one or more of the keys 46, 50, 52, 54 and 56, as shown for example in FIGS. 20–22.

Exemplary dimensions of the case 22 are provided here as follows: The length of the case 22, as measured across the front 30 between the ends 36 and 38, is preferably about 3.5 inches. Likewise, the width of the case 22 as measured between the sides 32 and 34 is preferably about 2.0 inches. The thickness of the case 22, as measured between the front 30 and back 40 is preferably about 0.039 inches (1.0 mm). Although not necessary, it may be desirable with certain companies or persons to preserve the compact nature of business card-size of the device 20. Accordingly, these provided dimensions may be maximum dimensions. In addition, the length and width of the display screen 28 are preferably about 2.875 inches and about 1.875 inches, respectively. It will be understood that the above-described dimensions can greatly vary depending on the desired screen size, electrical component size, and so on. The compact nature of the case 22 facilitates programming, distribution, carrying and using the display device 20. Although the case 22 is preferably of rectangular configuration, it will be understood that the case 22 may be circular, square, triangular, or other multi-sided shape.

Referring again to FIG. 6, the display screen 28 may comprise preexisting color or monochrome technology, such as but not limited to: LCD's, OLED's, TFT's, PLED character and/or graphical displays, bistable or stable displays that display an image with little or no electrical power, or technology yet to be developed. The display screen 28 is operably connected to the memory 25 and processor 24 in a manner which permits communication between the memory 25 and the processor 24. For example, if the information displayed upon the display screen 28 includes an active area, such as next page icon 70 in FIG. 6 or selection buttons 170–174 in FIG. 20, which may be activated by for example, positioning the pointer within the active area and subsequently depressing the ENTER key 46 to initiate the replacement of a displayed page of stored information by a subsequent or previous page of stored information, the processor 24 must be appraised that the active area of the screen 28 has been activated. Accordingly, the processor 24 and the display 26 are appropriately interfaced with one another.

In addition to the processor 24 and display 26, the device 20 also includes a battery 60 mounted within the case 22 (and to one side of the screen 28 as illustrated in FIG. 1) for supplying power to the electrical components of the display device 20. The battery 60 is preferably an ultra-thin printed battery and can be of the single-use or rechargeable type. Alternatively, the battery 60 can comprise one or more solar cells or the like.

In accordance with one embodiment of the invention, the display device 20 does not include a separate ON/OFF switch and, accordingly, is intended to be on from the moment that the processor 24 is connected to the battery 60 for receiving operating power therefrom. However insofar as the display screen 28 may present a drain upon available battery power, the processor 24 can include a battery-saving device 62 (FIG. 6) operably connected between the keys of the keypad 44 and the display 24 for placing the device 20 in a SLEEP mode if none of the keys of the keypad 44 are touched for a preselected period of time. The display device 20 is placed in the SLEEP mode by shutting off (by way of the processor 24) the power to the display screen 28.

In other words, by depressing any one of the five keys 46, 50, 52, 54 or 56 of the keypad 44, the page of information which was last displayed upon the screen 28 again becomes viewable to the user, but if a preselected period of time passes before any of the keys of the keypad 44 are depressed again, the processor 24 shuts the power off to the screen 28 to place the device 20 in the SLEEP mode. Accordingly, the processor 24 includes appropriate timing and comparison circuits 64 for monitoring the period of time between the last key actuation and shutting off power to the screen (e.g. fifteen seconds). More particularly, a predetermined time period is programmed into the circuitry 64, and the time from last key actuation is continually monitored and compared to the predetermined time period. When the monitored amount of time reaches the predetermined time period, the SLEEP mode is initiated.

In accordance with a further embodiment of the invention, one of the keys, such as the ENTER key 46, may be pressed for a predetermined time period, say three seconds, to alternately turn on and off the display device 20.

Figure 4:
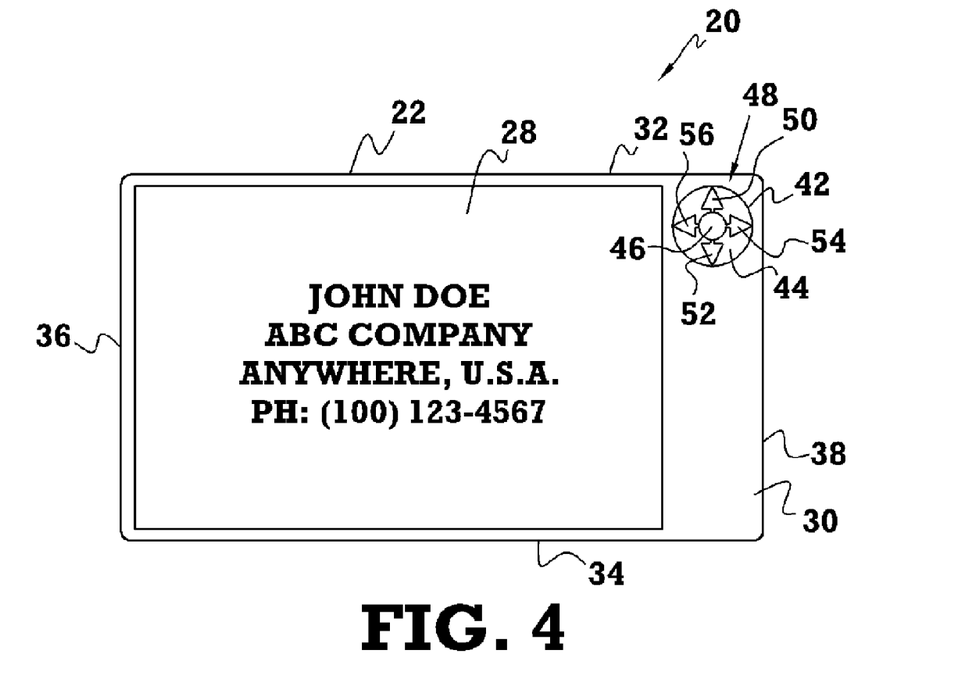
FIG. 4 is a view similar to FIG. 1 illustrating exemplary information which can be displayed on the electronic display device.

Operation of the device 10 will now be described with reference to FIGS. 4–6 and in connection with two separate examples. In the first example, the data stored in memory 25 can correspond to information to be displayed on a single page or frame, such as the name of an individual, company name and telephone number. As used herein, the term "page" or "frame" relates to information viewable on the display screen 28 at any instant of time, including information that may be viewed by accessing one or more of the scroll bars 59, 61 (FIG. 1). Accordingly, in this example, the information stored within the memory 25 is transmitted to the screen 28 where it is displayed for viewing by a user. Assuming that the device 20 is initially in the OFF position or SLEEP mode, the depression of any of the keys 46, 50, 52, 54 or 56 of the keypad 44 re-initiates power to the screen 28 so that the information is again displayed on the screen 28. It follows that in this first example, the navigation keys 50, 52, 54 or 56 can be used to initiate (or re-initiate) the display of stored information on the display screen 28, as well as scroll through the information displayed.

Figure 5:
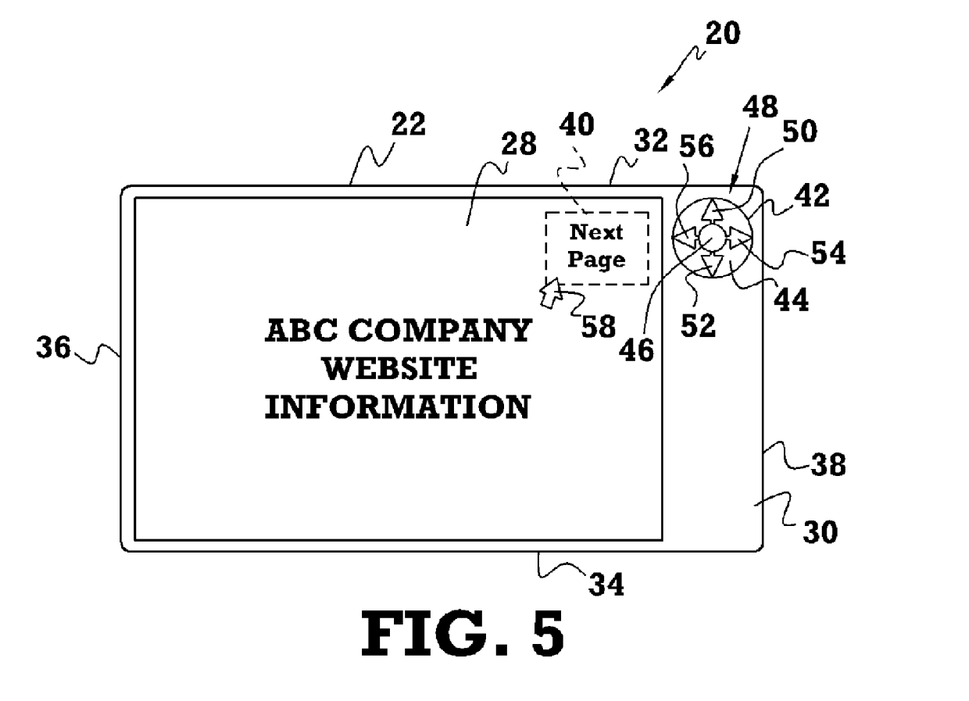
FIG. 5 is a view similar to FIG. 1 illustrating other exemplary information which can be displayed on the electronic display device.

In accordance with a second example and with reference to FIGS. 5 and 6, the information or data stored within the memory 25 includes multiple pages or frames of information, i.e. the displayed data is replaced with further data from the memory 25. Moreover, the multiple frames of information can be pre-programmed so that when displayed upon the screen 28, the frames of information can be displayed in a preprogrammed sequence. Accordingly, the display screen 28 can include at least one active area 70, as shown in FIG. 6, which enables a user to replace data displayed on the screen 28 with subsequent data. In order to allow a user to select subsequent pages or frames of information, the active area 70 of the screen 28 includes a "Next Page" icon enabling the user to replace the page being displayed upon the screen 28 with the next page of information in the pre-programmed sequence of pages by moving the pointer 58 (FIG. 5)) by means of the navigation keys 50, 52, 54 or 56 and pointer control means 72 until the pointer 58 overlies the active area 70 and then pressing the ENTER key 46.

Once pressed, the ENTER key 46 initiates a processor-generated command to replace the current page of information with the next page of information in the preprogrammed sequence of information. Repeated depression of the ENTER key 46 while the pointer 58 overlies the active area 70 of the displayed screen of information effects the sequential displaying of the subsequent pages of information upon the screen 28.

Referring to FIGS. 1, 2 and 6, the display device 20 also includes an interface 80 with a port 82 which is operably connected to the memory 25 for transferring data to be displayed between the display device 20 and a remote user station or other device. For example, information about a company that may be located on the world wide web can be transferred from the remote user station to the memory 25 for ultimate display on the screen 28. This same capability enables photographs to be downloaded into the memory 25 from, for example, a digital camera for display upon the screen 28. The term "remote user station" refers to, but is not limited to: personal computers, digital cameras, portable phones, personal digital assistants (PDA's), one or more portable memory devices such as CD-ROM's, DVD's, floppy disks, flash cards, memory sticks, or other memory devices currently in use or that may be developed in the future. Connection between the remote user station and the display device 20 can be realized through cables or connectors couplable between the display device 20 and one or more ports of the remote user station, such as, but not limited to, parallel, serial, USB, optical, and firewire ports. Alternatively, the interface 80 may be a wireless port for receiving data via wireless signals from the remote user station. Wireless signals may include, but are not limited to: infrared, UHF, microwave, or any other suitable transmission frequency, magnetic, or any other suitable wireless transmitting means. Although not shown, one or more display devices 20 may be positioned in a docking station connectable to the remote user device. Where it is desirable to disseminate the same information to a large number of persons, such as information related to a company, product and/or service, a plurality of display devices 20 may be simultaneously programmed through ganged programming or the like. By way of example, a wireless signal with company data may be sent to the wireless ports of a stack of display devices 20 for simultaneous programming. Whether or not the remote server station forms part of a network, such as a local area network, the Internet or the like, portable memory devices, or other suitable systems or components, the desired information to be displayed on the display device 20 can be selectively downloaded to and displayed on the display device in a predetermined manner or sequence, as will be described in greater detail below.

It will be understood that numerous modifications and substitutions can be had to the afore-described embodiment without departing from the spirit of the invention. For example, a timer circuit 90 (FIG. 6) can be incorporated within the processor 24 for effecting a change in the information being displayed upon the screen 28 following a preselected period of time or upon reaching a specific moment in time. By way of example, information stored within the memory 25 can relate to two redeemable store coupons, while the information relating to a first of such coupons is displayed upon the screen 28. Meanwhile, the timer circuit 90 monitors the length of time (e.g. in days or months) since the coupon-related information was downloaded into the memory 25 and automatically replaces the displayed information relating to the first of such coupons with information relating to the second of such coupons following expiration of the preselected time period. This feature is advantageous in that it facilitates the automatic display of unexpired coupon-related information when the previously-displayed coupon-related information becomes expired.

Referring now to FIGS. 7–22, a method for loading information onto one or more display devices 20 is illustrated, which may be implemented in hardware, software, or a suitable combination of hardware and software, and may be more than one software system operating on a general purpose user computing platform. As used herein, a software system may be implemented as one or more separate lines of code of a software program, one or more subroutines, one or more agents, one or more objects, one or more lines of code operating on different computer platforms, or other suitable software functionality. For example, a software system may include functionality that is provided by the operating system of the computing platform, plus other application-specific functionality. In one exemplary embodiment, a software system containing a setup module, a server module, and other suitable modules is downloaded to the user station from an Internet site, a portable memory device, or other suitable source. After the software is downloaded to the user station, the setup module is then run to create user interface screens to obtain and modify information, such as images and/or text, and transfer the information to one or more display devices.

Referring to FIGS. 7–11 in particular, once installed on the user station, the software system may be run to generate a virtual window 100 with different menus, such as "File", "Insert", "Tools" and "Help" which are selectable by a user for accessing different subroutines or functions of the software system through well-known techniques, such as a pointer 102 movable by a computer mouse (not shown) or other user input device. Scroll bars 110 and 112 may be associated with the window 100 for scrolling through the contents of the window 100. The window 100 may include a title bar 115 with virtual buttons 114, 116 and 118 for respectively minimizing, expanding and closing the window 100 in a well-known manner.

Figure 8:
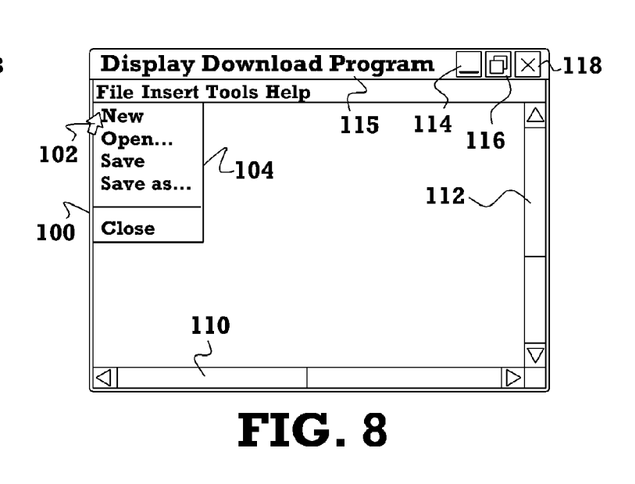
FIGS. 8–11 shows a representative menu screen with various menu items of the software program.

When the "File" menu is selected, as shown in FIG. 8, a drop-down window 104 appears with various menu items such as: "New" for creating a new data file that will be transferred to the display card 20; "Open" for accessing a previously saved data file; "Save" for saving the current data file to a user-specified location associated with the user station; "Save as" for saving the current data file to a user-specified location associated with the user station under a different file name; and "Close" for closing the current data file. It will be understood that the "File" menu items are given by way of example only and are not to be considered in any limiting sense.

Figure 9:
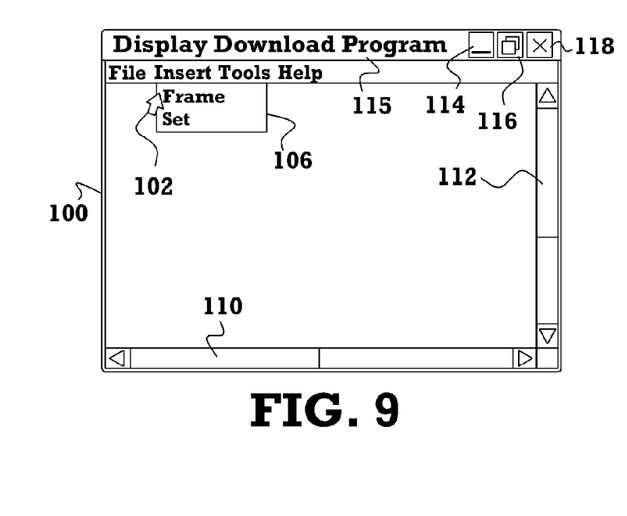
Figure 10:
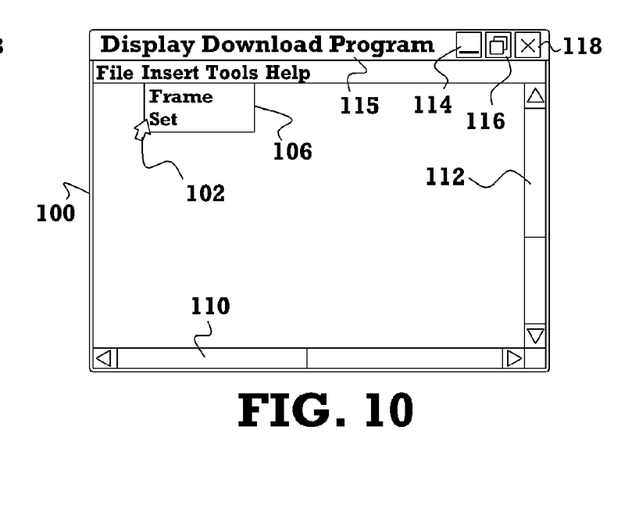

When the "Insert" menu is selected, as shown in FIGS. 9 and 10, a drop-down window 106 appears with various menu items such as: "Frame" for creating a single data frame which may include text and/or image data; and "Set" for creating a single data set that comprises one or more data frames. It will be understood that the "Insert" menu items are given by way of example only and are not to be considered in any limiting sense.

Figures 11, 13:
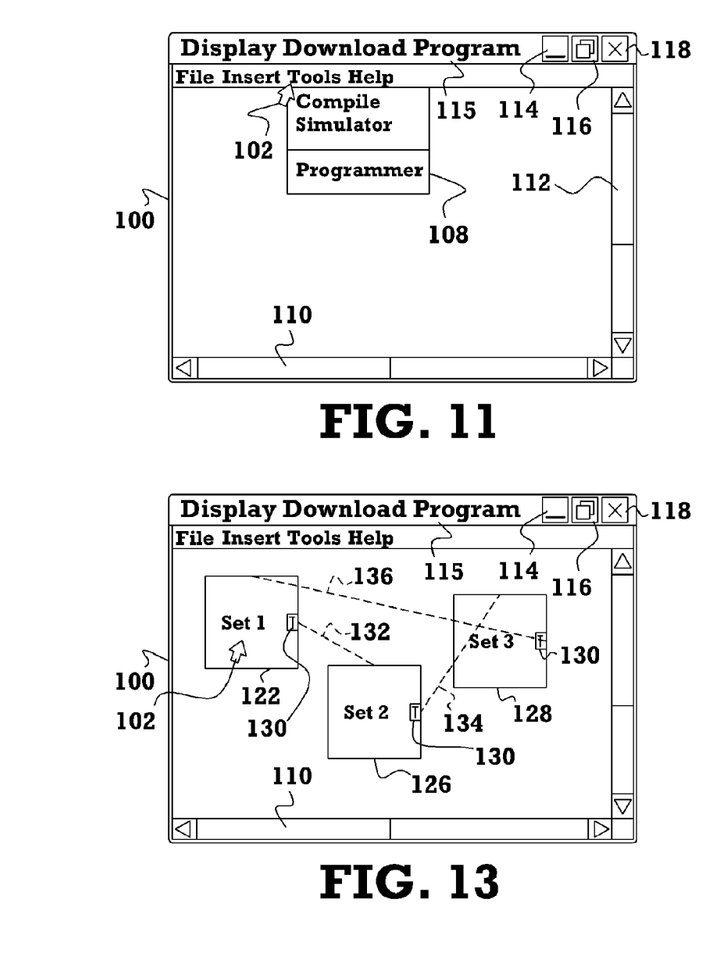
FIG. 13 illustrates the menu screen with a plurality of icons representing a plurality of data sets and how they may be interconnected.

When the "Tools" menu is selected, as shown in FIG. 11, a drop-down window 108 appears with various menu items such as: "Compile" for assembling or compiling the current file as defined by a user; "Simulator" for viewing and operating, preferably in a separate window, the currently compiled file on a virtual or software generated display device with a form and functionality similar to the actual display device 20; and "Programmer" for transferring the current file to the display device 20. It will be understood that the "Tools" menu items are given by way of example only and are not to be considered in any limiting sense.

Although not shown, when the "Help" menu is selected, various help menu items regarding operation of the software system can be provided. In addition, virtual buttons may be associated with each of the above-described menu items and arranged on a virtual tool bar for accessing the desired menu items in a well-known manner. Hot keys may also or alternatively be provided so that keyboard entry of certain keys will access the menu items.

Figures 12, 14:
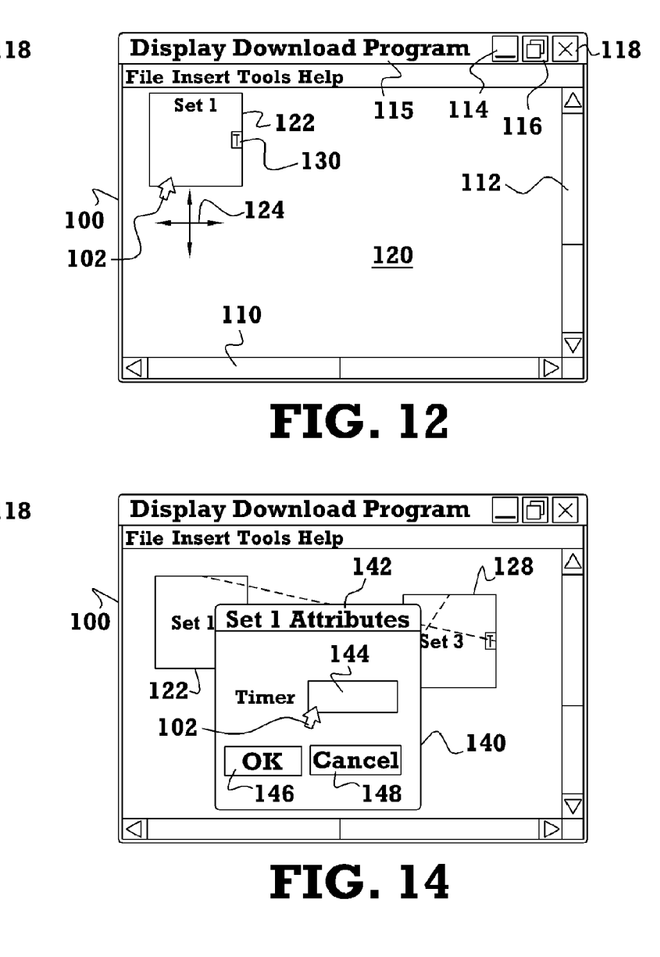
FIG. 12 illustrates the menu screen with an icon representing a first data set.
FIG. 14 shows a pop-up window for defining attributes of one of the data sets.

In operation, and with reference to FIGS. 8, 10 and 12, a new data file is created by defining one or more data sets. This can be accomplished by selecting "New" in the "File" menu (FIG. 8), and then selecting "Set" in the "Insert" menu (FIG. 10). The pointer 102 is then positioned in the open window area 120 of the virtual window 100 and the select button of a mouse or other user input device associated with the user station is actuated to create a first set box or icon 122, designated as "Set 1." The set box 122 can be moved to any desired location in the window area 120, as represented by arrows 124, through use of the well-known click-and-drag technique.

As shown in FIG. 13, further set boxes or icons, such as 126 and 128, respectively designated "Set 2" and "Set 3," can be created by inserting new sets into the open window area 120 as described above. It will be understood that the data file may contain more or less data sets depending on the desired information to be displayed on the display card 20. Preferably, each set icon includes a set timer function 130 that can be linked with other sets icons, as represented by dashed lines 132, 134 and 136. The dashed lines may be drawn between the set boxes by selecting a timer function 130 of one set box, then dragging the pointer 102 to another set box. The software system recognizes the link(s) between boxes and automatically sets the order or sequence of the data for display on the display device 20.

The timer function sets the amount of time that each set will display information before switching to another data set or terminating, depending on the desired outcome. Thus, in accordance with the example given in FIG. 13, data in "Set 1" will be displayed on the display device 20 for a first predetermined time period. Once the first time period has been reached, data in "Set 2" will be automatically displayed for a second predetermined time period since a first sequence link 132 has been defined between the first and second data set icons. Once the second time period has been reached, data in "Set 3" will automatically be displayed for a third predetermined time period since a second sequence link 134 has been defined between the second and third data set icons. Once the third time period has been reached, data in "Set 1" will automatically be displayed for the first predetermined time period since a third sequence link 136 has been defined between the third and first data set icons. It will be understood that more or less data sets and links can be provided. When it is desirous to show the sequence of data sets one time only, or to skip certain data sets, one or more of the sequence links can be eliminated or redirected to another data set. By way of example, removing the third sequence link 136 will terminate playback of the data sets once the third predetermined time period has been reached, while redirecting the third sequence link to "Set 2" will ensure that "Set 1" is viewed only once while "Set 2" and "Set 3" are repeatedly shown.

In order to set the timer function for each data set, the set box of interest can be selected by positioning the cursor 102 over the set box, such as set box 122 as shown in FIG. 13, then double clicking the select button of the input device or pressing the "enter" key on a user keyboard (not shown), or by employing other well-known user selection techniques. When the particular set box is selected, a pop-up window 140 is displayed as shown in FIG. 14. The window 140 may include a title bar 142 indicating which set has been selected, a timer input window 144 for specifying the amount of time that the selected set will be displayed, and virtual selecting buttons 146 and 148 for respectively accepting or canceling the inputted set attributes.

Figure 15:
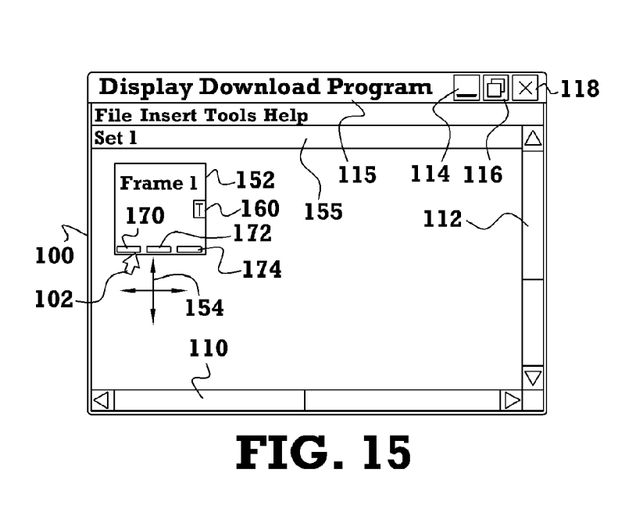
FIG. 15 shows an icon of a first data frame within a data set.

With reference now to FIG. 15, in order to define the number of frames for each data set and the particular information associated with each frame, the set box of interest can be selected by positioning the cursor 102 over the set box, such as set box 122 as shown in FIG. 13, then clicking the menu button of the input device (right click for a right-hand mouse configuration). Once selected, the set boxes will disappear and a new open window area 150 will appear. If no frames have been previously defined, the open window area 150 will initially be blank. In addition, a title bar 155 may be shown to indicate the current data set.

A new data frame is preferably created in a similar manner as creating a new data set previously described. This can be accomplished by selecting "Frame" in the "Insert" menu (FIG. 9). The pointer 102 is then positioned in the open window area 150 of the virtual window 100 and the select button of a mouse or other user input device associated with the user station is actuated to create a first frame box or icon 152, designated as "Frame 1." The frame box 152 can be moved to any desired location in the window area 150, as represented by arrows 154, through use of the well-known click-and-drag technique.

Figure 16:
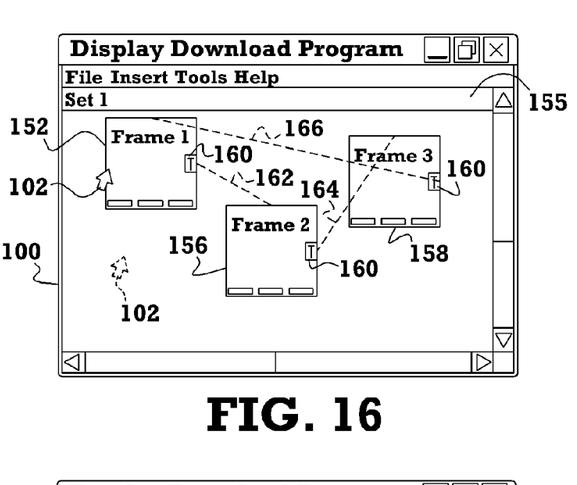
FIG. 16 illustrates a plurality of icons representing a plurality of data frames within a single data set and how they may be interconnected.

As shown in FIG. 16, further frame boxes or icons, such as 156 and 158, respectively designated "Frame 2" and "Frame 3," can be created by inserting new frames into the open window area 150 as previously described. It will be understood that the data set may contain more or less data frames depending on the desired information to be displayed on the display card 20. Preferably, each frame includes a frame timer function 160 that can be linked with other frames, as represented by dashed lines 162, 164 and 166. The dashed lines may be drawn between the frame boxes by selecting a timer function 160 of one frame box, then dragging the pointer 102 to another frame box. The software system recognizes the link(s) between frame boxes and automatically sets the order or sequence of the data for display on the display device 20.

The timer function sets the amount of time that each frame will display information before automatically switching to another frame or terminating, depending on the desired outcome. Thus, in accordance with the example given in FIG. 16, data in "Frame 1" will be displayed on the display device 20 for a first predetermined time period. Once the first time period has been reached, data in "Frame 2" will be automatically displayed for a second predetermined time period since a first sequence link 162 has been defined between the first and second data frame icons. Once the second time period has been reached, data in "Frame 3" will automatically be displayed for a third predetermined time period since a second sequence link 164 has been defined between the second and third data frame icons. Once the third time period has been reached, data in "Frame 1" will automatically be displayed again for the first predetermined time period since a third sequence link 166 has been defined between the third and first data frame icons. It will be understood that more or less data frames and links can be provided. When it is desirous to show the sequence of data frames one time only, or to skip certain data frames, one or more of the sequence links can be eliminated or redirected to another data frame. By way of example, removing the third sequence link 166 will terminate playback of the data frames once the third predetermined time period has been reached, while redirecting the third sequence link to "Frame 2" will ensure that "Frame 1" is viewed only once while "Frame 2" and "Frame 3" are repeatedly shown.

Figure 17:
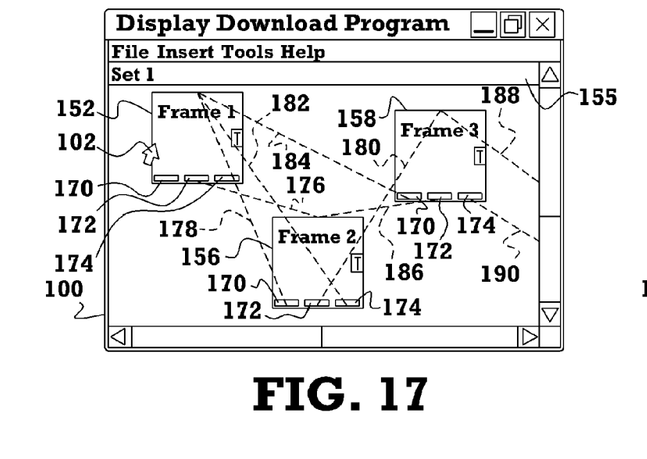
FIG. 17 shows a plurality of icons representing a plurality of data frames within a single data set and a further manner in which they may be interconnected.

Referring now to FIG. 17, each frame can be programmed for manual selection and sequential display on the display device 20 by providing programmable sequence icons or buttons 170, 172 and 174 for each frame and linking frames together via the programmable sequence icons, as represented by dashed lines 176–190. By way of example, and referring to FIG. 20, each programmable sequence icon 170, 172 and 174 can be programmed with text such as "Home", "Back" and "Next". These same icons will be displayed on the screen 28 of the display device 20 for manual user selection of a desired image or text. By way of example, the LEFT key 56, RIGHT key 54 and/or ENTER key 46 of the display device 20 (FIG. 1) may be used for accessing and selecting the buttons 170, 172 and 174 in the active display area of the screen 28 so that a predetermined sequence of images or other data may be viewed on the screen 28. Accordingly, as shown in FIG. 17, the dashed lines 176–190 link individual virtual buttons with a previous or subsequent frame, so that selection of the button on the display device causes the data associated with the linked frame to appear. In accordance with the exemplary configuration, manually selecting the virtual "Home" button on each frame will return the display screen 28 to the image associated with "Frame 1". Likewise, selecting the virtual "Next" button on "Frame 1" will display the data associated with "Frame 2". Selecting the "Back" button on "Frame 3" will display the data associated with "Frame 2", and so on. Dashed lines 188 and 190 represent links to other frames not shown in the open window area 150. It will be understood that any desired text denoting frame direction can be programmed into the programmable sequence icons or buttons 170, 172 and 174. It will be further understood that more or less programmable sequence icons or buttons may be provided.

Although manual and automatic timer features have been shown as separate functions in FIGS. 16 and 17, it will be understood that manual selection and automatic timing can be combined within the same data set to provide a combination of still images and pseudo-still images or video.

Figure 18:
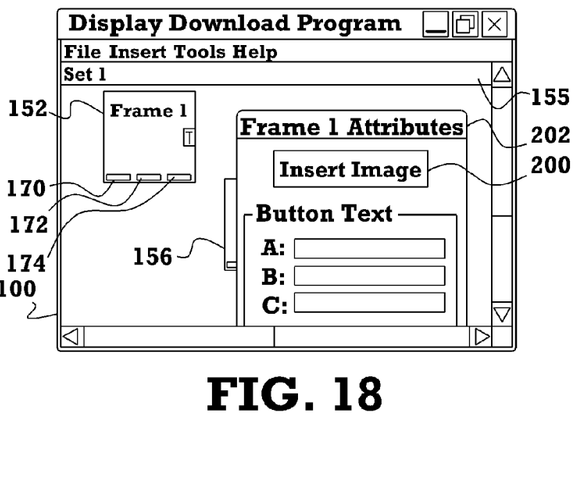
FIG. 18 shows a pop-up window for defining attributes of one of the data frames.
Figure 19:
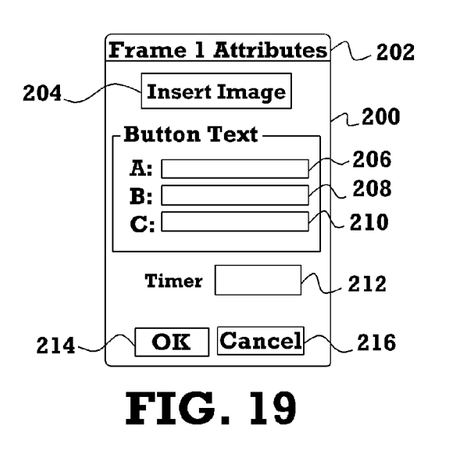
FIG. 19 is an enlarged view of the data frame pop-up window.

In order to set the attributes for each data frame, the frame box of interest can be selected by positioning the cursor 102 over the frame box, such as frame box 152 as shown in FIG. 16, then double clicking the select button of the input device or pressing the "enter" key on a user keyboard (not shown), or by employing other well-known user selection techniques. When the particular frame box is selected, a pop-up window 200 is displayed as shown in FIGS. 18 and 19. The window 200 preferably includes a title bar 202 indicating which frame box has been selected, a virtual button 204 for inserting an image file from a memory device, programmable button windows 206, 208 and 210 for inputting text for the programmable sequence buttons or icons, a timer input window 212 for specifying the amount of time that the selected frame or image associated with the frame will be displayed, and virtual selecting buttons 214 and 216 for respectively accepting and canceling the inputted frame attributes.

Figure 20:
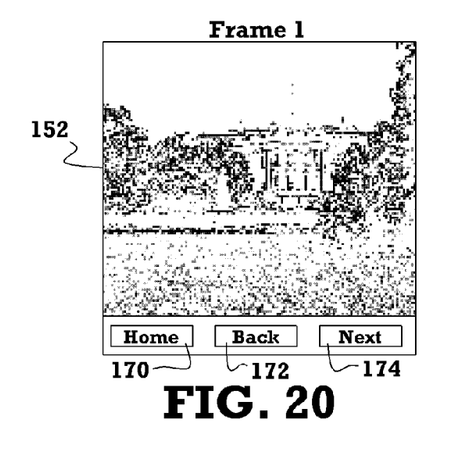
FIG. 20 shows representative data of a first data frame.
Figure 21:
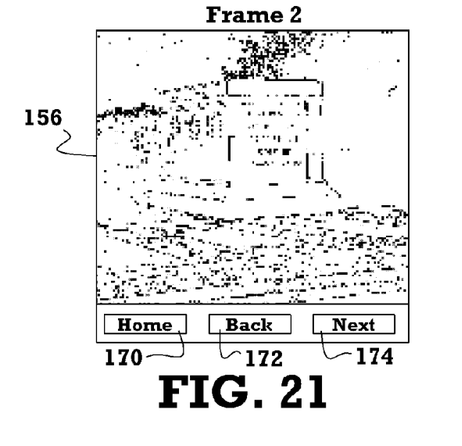
FIG. 21 shows representative data of a second data frame.
Figure 22:
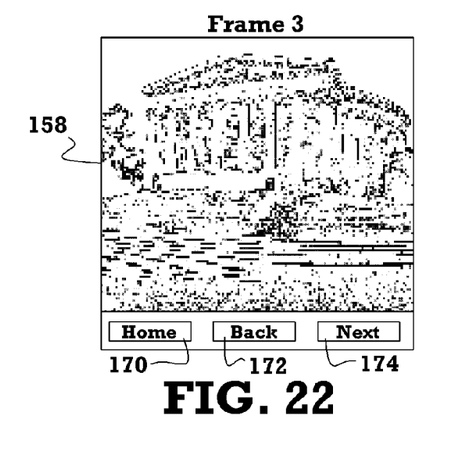
FIG. 22 shows representative data of a third data frame.

Referring to FIGS. 20–22, data frames 152, 156 and 158 have been programmed with exemplary images and button text that will be viewable on the display device 20 once the data is transferred. Once programmed, the particular set can be exited by positioning the pointer 102 at an empty position on the open window area 150 (as denoted by the pointer icon 102 in dashed line in FIG. 16) and then double clicking the user input device to return to the display 100 as shown in FIG. 13. Other data frames in additional data sets may be programmed in a similar manner. It will be understood that the data associated with the data frames can include still images, text, video, and combinations thereof, etc., in any desired format or arrangement for display on the display device 20.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

What is claimed is:

1. A method for transferring data from a user station to a portable electronic display device, the method comprising:
   providing a first virtual window at the user station;
   inserting at least one data set icon into the first virtual window, the data set icon being representative of data including a sequence of images;
   selecting the data set icon to thereby open a second virtual window representative of the at least one data set icon;
   inserting a plurality of data frame icons into the second virtual window, each data frame icon being representative of data relating to a different image;
   selecting each data frame icon within the second virtual window and associating different image data with each data frame icon;
   linking at least two of the data frame icons together so that the images are arranged for display in a predetermined sequence; and
   transferring the image data to the portable electronic display device for viewing the images in the predetermined sequence on the portable electronic display device.

2. A method according to claim 1, wherein the step of inserting at least one data set icon comprises inserting a plurality of data set icons, each data set icon being representative of data including different sequences of images.

3. A method according to claim 2, wherein the step of inserting a plurality of data frame icons includes inserting a plurality of data frame icons into the second virtual window of each data set icon.

4. A method according to claim 3, and further comprising linking at least two of the data set icons together so that the different sequences of images are arranged for display in a predetermined sequence on the portable electronic display device.

5. A method for transferring data from a user station to a portable electronic display device, the method comprising:
   providing a first virtual window at the user station;
   inserting at least one data set icon into the first virtual window;
   opening a second virtual window representative of the at least one data set icon;
   inserting a plurality of data frame icons into the second virtual window;
   associating different data with each of the data frame icons;
   linking at least two of the data frame icons together so that the data associated with the at least two data frame icons are displayed in sequence on the portable electronic display device;
   providing a frame timer function for each frame icon; and
   transferring the data including information relating to the at least one data set and at least one data frame icon to the portable electronic display device.

6. A method according to claim 5, wherein the frame timer function of each data frame icon is programmable by a user to specify at least one predetermined time period for displaying the data for the predetermined time period.

7. A method according to claim 6, and further comprising providing a plurality of sequence buttons for each frame icon.

8. A method according to claim 7, wherein the sequence buttons for each frame icon are programmable by a user to specify a manually selectable sequence for displaying the data.

9. A method according to claim 8, wherein the step of linking at least two of the data frame icons together includes associating at least one sequence button of one frame icon with another frame icon.

10. A method for transferring data from a user station to a portable electronic display device, the method comprising:
    providing a first virtual window at the user station;
    inserting at least one data set icon into the first virtual window;
    opening a second virtual window representative of the at least one data set icon;
    inserting a plurality of data frame icons into the second virtual window;
    associating data with each of the data frame icons;
    linking at least two of the data frame icons together so that the data associated with the at least two data frame icons are displayed in sequence on the portable electronic display device;
    providing a plurality of sequence buttons for each frame icon; and
    transferring the data including information relating to the at least one data set and at least one data frame icon to the portable electronic display device.

11. A method according to claim 10, wherein the sequence buttons for each frame icon are programmable by a user to specify a manually selectable sequence for displaying the data.

12. A method according to claim 11, wherein the step of linking at least two of the data frame icons together includes associating at least one sequence button of one frame icon with another frame icon.

13. A method according to claim 10, wherein the step of inserting at least one data set icon into the first virtual window comprises inserting a plurality of data set icons into the virtual window.

14. A method according to claim 13, wherein the step of inserting a plurality of data frame icons comprises inserting a plurality of data frame icons into the second virtual window of each data set.

15. A method according to claim 14, wherein the step of associating data includes associating different data with each data frame icon.

16. A method for transferring data from a user station to a portable electronic display device, the method comprising:

providing a first virtual window at the user station;
inserting a plurality of data set icons into the first virtual window;
opening second virtual windows representative of each data set icon;
inserting a plurality of data frame icons into the second virtual window of each data set icon;
associating data with each of the data frame icons;
linking at least two of the data set icons together so that the data associated with the at least two data set icons are displayed in sequence on the portable electronic display device; and
transferring the data including information relating to the plurality of data set icons and the plurality of data frame icons to the portable electronic display device.

17. A method according to claim 16, and further comprising providing a set timer function for each data set icon.

18. A method according to claim 17, wherein the set timer function of each data set icon is programmable by a user to specify at least one predetermined time period for displaying the data for the predetermined time period.

19. A method for transferring data from a user station to a portable electronic display device, the method comprising:

providing a first virtual window at the user station;
inserting a plurality of data set icons into the first virtual window, the data set icons being representative of data sets;
linking the data set icons together such that data sets are displayed on the portable electronic display device in a predetermined sequence;
providing second virtual windows corresponding to the data set icons;
inserting a plurality of data frame icons into each second virtual window, the data frame icons being representative of data frames;
linking the data frame icons together such the data frames are displayed on the portable electronic display device in a predetermined sequence for each data set;
providing a frame timer function for each data frame icon; and
transferring the data sets including the data frames to the portable electronic display device for display thereon.

20. A method according to claim 19, and further comprising providing a set timer function for each data set icon.

* * * * *